Patented Apr. 3, 1923.

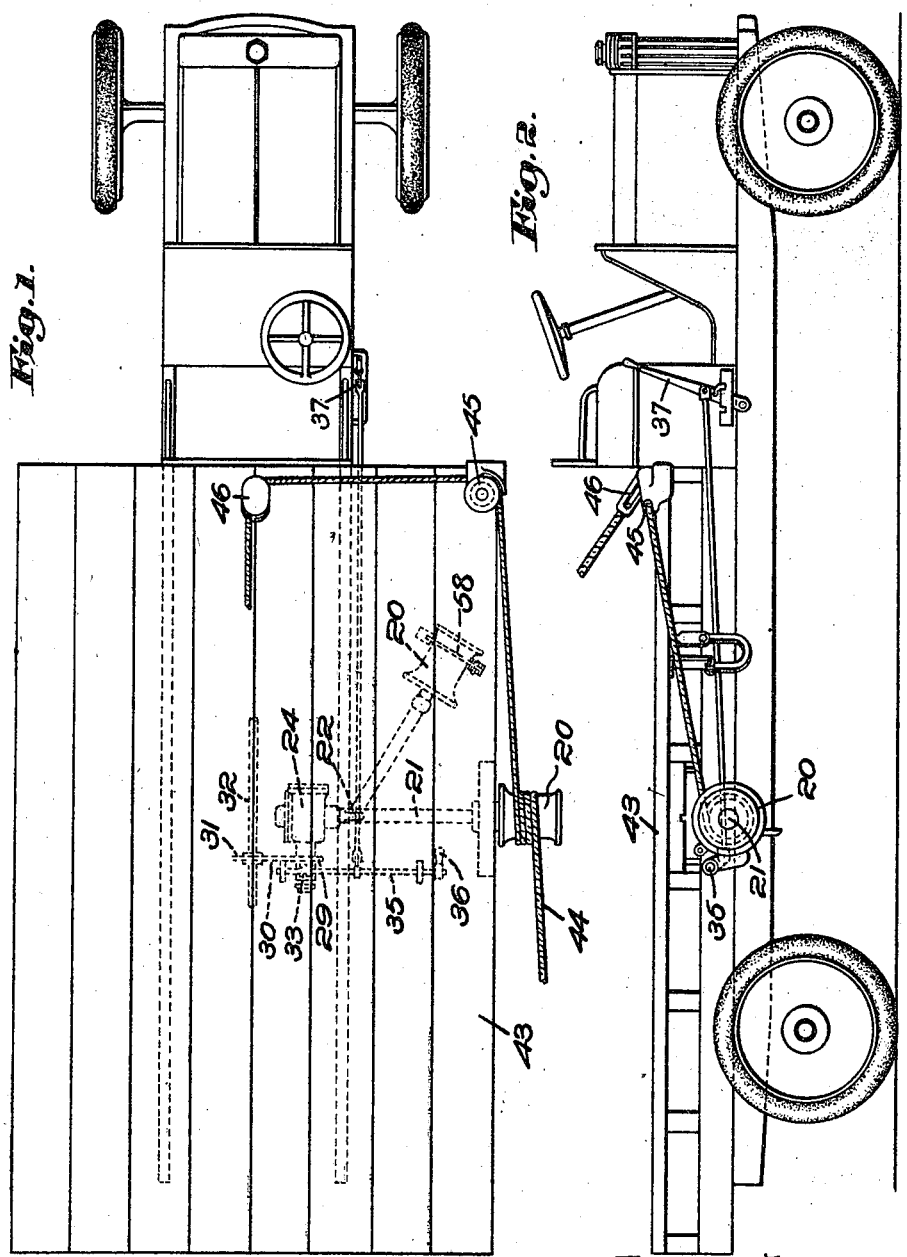

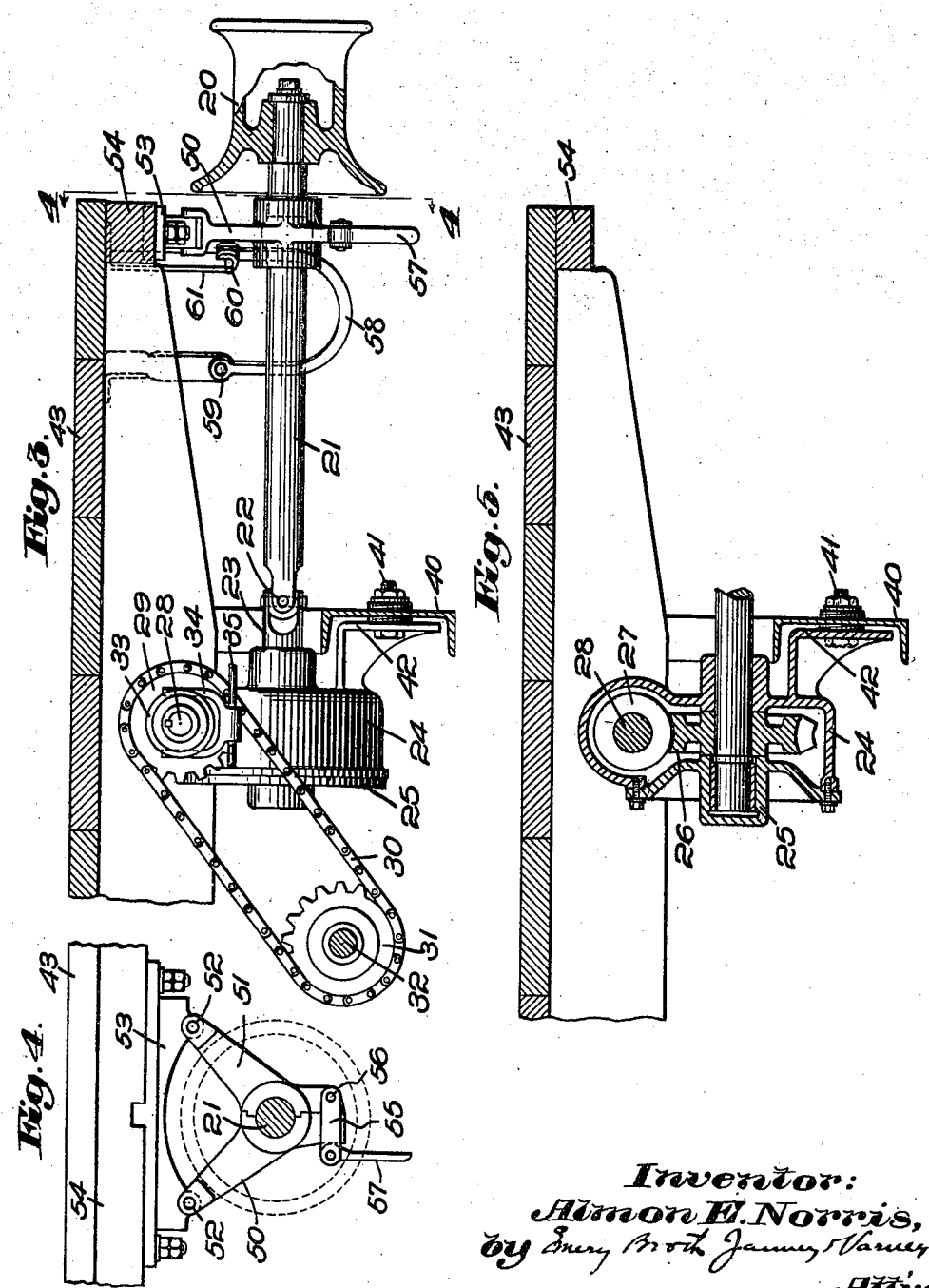

1,450,301

UNITED STATES PATENT OFFICE.

ALMON E. NORRIS, OF BROOKLINE, MASSACHUSETTS.

AUTOMOBILE WINCH.

Application filed April 16, 1919. Serial No. 290,535.

*To all whom it may concern:*

Be it known that I, ALMON E. NORRIS, a citizen of the United States, and a resident of Brookline, in the county of Norfolk and State of Massachusetts, have invented an Improvement in Automobile Winches, of which the following description, in connection with the accompanying drawings, is a specification, like characters on the drawings representing like parts.

This invention relates to automobile winches, being more particularly concerned with improvements in the construction of winches for automobile use, and their attachment and relation to the automobile structure and the driving mechanism thereof.

The invention will be best understood by reference to the following description, when taken in connection with the accompanying illustration showing one specific embodiment thereof, while its scope will be more particularly pointed out in the appended claims.

In the drawings, Fig. 1 is a plan view of a typical form of automobile truck equipped with one embodiment of the invention;

Fig. 2 is a side elevation of the truck shown in Fig. 1;

Fig. 3 is a rear elevation on an enlarged scale showing the power driven winch illustrated in Fig. 1;

Fig. 4 is an end elevation, partially in section, of the apparatus shown in Fig. 3 and illustrating the construction of the split bearing, and Fig. 5 is a vertical longitudinal section showing the driving mechanism.

Referring to the drawings and particularly to the illustrative embodiment of the invention shown therein, there is provided a winch head 20, which is fixedly secured to the end of the driving shaft 21, the latter connected through a universal joint 22 with the end of a transmission shaft 23 projecting from the housing or casing 24. The interior construction of the latter and the contained driving gearing may be substantially similar to the construction shown in Fig. 5, the transmission shaft being journaled in bearings carried by the casing and by the flanged plate or closure 25, which is bolted to one side of the casing. Within the casing the shaft has fixedly secured thereon a worm gear 26, the latter meshing with a worm 27, on the worm shaft 28, which shaft is also journaled in the casing and carries exterior thereto the sprocket wheel 29, which is loosely mounted thereon and driven by the sprocket chain 30, from the sprocket wheel 31.

The latter is mounted upon a power take-off shaft 32 which is connected to the transmission gearing or any suitable driven member on the power plant of the automobile. I have conventionally indicated the shaft 32 in Fig. 1, and the same is preferably connected to the transmission gearing but it may have connection to some other part of the driving mechanism of the machine.

The sprocket wheel 29, which is loosely mounted on the worm shaft 28, may be connected to or disconnected therefrom by the sliding clutch member 33 adapted to be actuated by the clutch yoke 34, moved by the rock shaft 35 and the operating arm 36 (see Fig. 1), the shaft being also connected to the lever 37 at the driver's seat.

Herein the supporting housing 24 for the transmission gearing is clamped directly to the inner face of the side frame member 40 of the chassis by means of one or more clamping bolts 41 which engage the flanged bracket 42 on the housing.

The parts are preferably so arranged that the attachment is wholly beneath the level of the floor 43 of the truck, and the winch when in use projects slightly beyond the outer limits of the truck body so that the cable 44 employed in connection therewith may be carried to any suitable point and over any necessary guide sheaves such for example as the corner block 45 and the centrally located sheave 46.

When the winch is out of use it may be desirable to shift it from the exposed position shown in Fig. 3 and in full lines in Fig. 1, to a position within the limits of the truck body. For this purpose, the outer bearing of the shaft 21 is so arranged that the shaft may be disconnected therefrom and the winch and shaft swung about the universal joint 22 into some angularly inclined position where it occupies a housed relation such as is shown in dotted lines, and there retained until it is desired to further utilize the winch.

To this end, the outer bearing is formed of two separable arms 50 and 51, which are pivoted each upon an ear 52 depending from a plate 53, the latter bolted or otherwise suitably secured to the longitudinal frame member 54 carried by the underside of the body portion of the truck along the marginal edge thereof. The two halves of the bearing are normally clamped together by any suitable clamping means such as the clamping band or yoke 55, pivoted at 56 upon one of the arms and carrying the cam shaped lever 57 which may be swung into such position as to clamp the two halves tightly together, or may be moved to release them and allow them to separate.

When it is desired to house the winch and swing it out of its exposed position, the two bearing arms 50 and 51 are opened and the winch swung around to the inclined position indicated in Fig. 1, and there secured by any suitable means, as by the supporting hook 58 which is pivoted at 59 on a depending support and has the free end 60 which may be swung up about the winch to embrace the same and engage the depending hook 61.

This mechanism provides a winch attachment having a winch head shiftable into two positions, one preferably beneath the platform of the truck body and the other preferably outside the marginal portion of the truck body, the driving gearing for the winch, however, being mounted and secured upon the chassis frame member 40. The universal joint not only permits the swinging adjustment of the winch described, but it also permits the attachment to adapt itself to any inexactness in the alignment of the driving gearing mounted upon the frame member 40 and the supporting bearing, which latter is secured to the longitudinal body member 54.

While for purposes of illustration, I have herein shown and described one specific embodiment of the invention, it is to be understood that I am not limited thereto but that extensive deviations may be made from the constructional features of form and relative arrangement of parts herein shown and from the mode of connection herein adopted to the driving mechanism of the automobile, all without departing from the spirit of the invention.

Caims—

1. In a vehicle, a winch comprising driving gearing, a winch head and driving shaft therefor having a universal joint and permitting said winch head to be shifted into a position inside or outside of the marginal portion of the car body.

2. A winch attachment for automobiles comprising driving gearing and a swinging winch head adapted to be moved to an exposed operating position or an unexposed position when out of use.

3. In a vehicle, the combination of driving mechanism, and a winch head driven thereby and swingingly mounted to move from place to place with reference to the vehicle.

4. In a vehicle, the combination of driving mechanism, and a winch head driven thereby and swingingly mounted to be shifted from an exposed position to an unexposed position.

5. In a vehicle, the combination of driving mechanism, and a winch head driven thereby and swingingly mounted for movement from a position without the outline of the body to a position within.

6. In a vehicle, the combination of driving means, and driven means including a shaft and a winch head carried thereby and swingingly mounted with reference to said driving means.

7. In a vehicle, the combination of driving means, a winch head driven thereby, a mounting for said winch head, and a pivotal joint providing for swinging movement of said mounting and winch head about an axis transverse to the axis of said winch head.

8. In a vehicle, the combination of driving means, a winch head driven thereby, a swinging mounting on which said winch head is mounted to move from an advanced to a retracted position, and means affording support for said mounting when said winch head is in its retracted position.

9. In a vehicle, the combination of driving mechanism and a winch head driven thereby and having its axis angularly adjustable.

10. In a vehicle, the combination of driving mechanism, a winch head driven thereby, and a support on which said winch head is mounted for movement about an axis transverse to its own.

11. In a vehicle, the combination of driving mechanism, a winch head driven thereby, and a support on which said winch head is mounted for movement about an axis transverse to its own from an exposed working position to a substantially unexposed position.

12. In a vehicle, the combination of a load platform, and a winch mechanism for moving loads with relation to said platform, including a winch head mounted to swing from a position in which it is adapted to move loads on said platform to a position in which it is shielded by said platform.

13. In a vehicle, the combination of a load platform, and a winch mechanism for moving loads with relation to said platform, including a winch head mounted for movement about an axis transverse to its own, and means for supporting said winch head in any one of a plurality of positions with relation to said platform.

14. In a vehicle, the combination of a load platform, and a winch mechanism for moving loads with relation to said platform, including a winch head mounted for movement about an axis transverse to its own, and driving means beneath said platform and connected to said winch head.

In testimony whereof, I have signed my name to this specification.

ALMON E. NORRIS.